United States Patent
Oshima

(10) Patent No.: US 9,462,142 B2
(45) Date of Patent: Oct. 4, 2016

(54) ELECTRONIC DEVICE AND DISPLAY CONTROL METHOD OF ELECTRONIC DEVICE

(71) Applicant: SEIKO EPSON CORPORATION, Tokyo (JP)

(72) Inventor: Yasuhiro Oshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/834,738

(22) Filed: Aug. 25, 2015

(65) Prior Publication Data

US 2016/0080592 A1 Mar. 17, 2016

(30) Foreign Application Priority Data

Sep. 11, 2014 (JP) ................................ 2014-185242

(51) Int. Cl.
*H04N 1/00* (2006.01)

(52) U.S. Cl.
CPC ...... *H04N 1/00411* (2013.01); *H04N 1/00244* (2013.01); *H04N 1/00384* (2013.01); *H04N 1/00474* (2013.01); *H04N 1/00514* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 2009/0055764 A1* | 2/2009 | Katsumata | ............ | G06F 9/4443 715/764 |
| 2010/0123938 A1* | 5/2010 | Sunami | ............ | G06F 17/30905 358/1.18 |
| 2014/0082477 A1* | 3/2014 | Hamada | ............ | G06F 9/45529 715/234 |
| 2014/0146364 A1* | 5/2014 | Matsumoto | ........ | H04N 1/00217 358/1.15 |
| 2015/0234555 A1* | 8/2015 | Kobayashi | .......... | G06F 3/04842 715/777 |

FOREIGN PATENT DOCUMENTS

JP 2014-048746 A 3/2014

OTHER PUBLICATIONS

Yusuke. Printing Server and Printing System, Mar. 17, 2014, Machine Translation Japanese Patent Application Publication, JP2014048746, All Pages.*

* cited by examiner

*Primary Examiner* — Ngon Nguyen
(74) *Attorney, Agent, or Firm* — Global IP Counselors, LLP

(57) ABSTRACT

A multifunction machine includes a user interface having a display screen, a first control circuit that controls the multifunction machine, and a second control circuit that controls communication with a management server. The first control circuit causes the display screen to display a native screen based on native screen information prepared by the multifunction machine. The second control circuit receives browser screen information from the management server and causes the display screen to display a browser screen based on the browser screen information.

8 Claims, 9 Drawing Sheets

ELECTRONIC DEVICE AND DISPLAY CONTROL METHOD OF ELECTRONIC DEVICE

BACKGROUND

1. Technical Field

The present invention relates to an electronic device including a display screen and a display control method of the electronic device.

2. Related Art

JP-A-2014-48746 describes a multifunction machine (an example of the electronic device) having a web browser function. Such a multifunction machine can perform various processing such as printing, copying, and scanning. A control device of the multifunction machine is provided with a microcomputer (a control circuit) including a CPU and a memory. For example, when a user requires the multifunction machine to perform printing, the microcomputer controls drive of a printing unit, so that the printing is performed on paper.

A display screen is provided as a user interface of the multifunction machine. It is possible to cause the display screen to display a screen that is previously prepared in the control device of the multifunction device or a native screen that is a screen created by the control device and to display a browser screen that is a screen created by a management server that can communicate with the multifunction machine.

By the way, when the browser screen is caused to be displayed on the display screen, the microcomputer receives (downloads) browser screen information which is information related to the browser screen from the management server and the microcomputer causes the display screen to display the browser screen based on the browser screen information. In this manner, the microcomputer that performs display control also performs various processing such as printing, so that a control load of the microcomputer increases.

SUMMARY

An advantage of some aspects of the invention is to provide an electronic device and a display control method of an electronic device which can suppress increase of control load of a control circuit when the control circuit causes the display screen to display a screen based on screen information received from the management server.

An electronic device according to an aspect of the invention is an electronic device that can communicate with a management server through a network. The electronic device includes a user interface having a display screen, a first control circuit that controls the electronic device, and a second control circuit that controls communication with the management server. The first control circuit causes the display screen to display a screen based on native screen information that is screen information prepared by the electronic device. The second control circuit receives screen information from the management server and causes the display screen to display a screen based on the screen information.

According to the above configuration, when displaying the screen based on the native screen information prepared by the electronic device on the display screen, display control is performed by the first control circuit that controls the electronic device. On the other hand, when displaying the screen based on the screen information received from the management server on the display screen, display control is performed by the second control circuit that controls communication with the management server instead of the first control circuit. The display control is shared by the two control circuits in this manner, so that it is possible to suppress increase of control load of the first control circuit when causing the display screen to display the screen based on the screen information received from the management server.

In the electronic device described above, it is preferable that the first control circuit determines a control circuit that performs display control and the second control circuit receives screen information from the management server and causes the display screen to display a screen based on the screen information when the first control circuit permits the second control circuit to perform display control.

According to the above configuration, the determination on whether the first control circuit or the second control circuit performs the display control is performed by the first control circuit. Therefore, when the screen is switched from the screen based on the native screen information to the screen based on the screen information received from the management server, the control circuit that performs the display control is smoothly switched from the first control circuit to the second control circuit, so that it is possible to smoothly switch the content of the display screen. Therefore, when the screen is switched from the screen based on the screen information received from the management server to the screen based on the native screen information, the control circuit that performs the display control is smoothly switched from the second control circuit to the first control circuit, so that it is possible to smoothly switch the content of the display screen.

In the electronic device described above, it is preferable that the user interface includes a touch panel, when the touch panel is operated, panel operation information that is information related to the operation of the touch panel is inputted into either one control circuit of the first and the second control circuits, when the other control circuit of the first and the second control circuits performs display control; the one control circuit outputs the inputted panel operation information to the other control circuit, and the other control circuit performs processing according to the panel operation information inputted from the one control circuit.

According to the above configuration, even when the control circuit that performs the display control is the first control circuit or the second control circuit, the panel operation information related to the operation of the touch panel is inputted into the one control circuit. Therefore, as compared with a case in which the panel operation information is inputted into the first control circuit when the first control circuit performs the display control and the panel operation information is inputted into the second control circuit when the second control circuit performs the display control, it is possible to suppress complication of the configuration of the electronic device because the electronic device does not require a configuration to switch the input destination of the panel operation information.

Further, when the other control circuit performs the display control, the panel operation information is inputted into the other control circuit through the one control circuit. Therefore, the other control circuit can perform processing according to a request of a user who operates the touch panel.

In the electronic device described above, it is preferable that the user interface includes a touch panel, when the touch panel is operated, panel operation information that is information related to the operation of the touch panel is inputted into the second control circuit, when the first control circuit performs display control, the second control circuit outputs the inputted panel operation information to the first control circuit, and the first control circuit performs processing according to the panel operation information inputted from the second control circuit.

According to the above configuration, even when the control circuit that performs the display control is the first control circuit or the second control circuit, the panel operation information related to the operation of the touch panel is inputted into the second control circuit that controls communication with the management server. Therefore, as compared with a case in which the panel operation information is inputted into the first control circuit when the first control circuit performs the display control and the panel operation information is inputted into the second control circuit when the second control circuit performs the display control, it is possible to suppress complication of the configuration of the electronic device because the electronic device does not require a configuration to switch the input destination of the panel operation information.

Further, when the first control circuit performs the display control, the panel operation information is inputted into the first control circuit through the second control circuit. Therefore, the first control circuit can perform processing according to a request of a user who operates the touch panel.

When the second control circuit performs the display control, the second control circuit may transmit the inputted panel operation information to the management server. When it is assumed that an electronic device in which the panel operation information is inputted into the first control circuit is an electronic device of a comparative example, in the electronic device of the comparative example, the panel operation information is transmitted to the management server through the first control circuit and the second control circuit, so that a delay easily occurs when the panel operation information is transmitted to the management server. In this respect, in the configuration described above, the panel operation information is inputted into the second control circuit, so that, different from the electronic device of the comparative example, a delay hardly occurs when the panel operation information is transmitted to the management server. Therefore, it is possible to contribute to increasing the processing speed of a system including the electronic device and the management server.

In the electronic device described above, it is preferable that the user interface includes a push-button type hard key, when the hard key is operated, key operation information that is information related to the operation of the hard key is inputted into the first control circuit, and the first control circuit performs processing according to the inputted key operation information.

According to the above configuration, even when the control circuit that performs the display control is the first control circuit or the second control circuit, the key operation information related to the operation of the hard key is inputted into the first control circuit. Therefore, as compared with a case in which the key operation information is inputted into the first control circuit when the first control circuit performs the display control and the key operation information is inputted into the second control circuit when the second control circuit performs the display control, it is possible to suppress complication of the configuration of the electronic device because the electronic device does not require a configuration to switch the input destination of the key operation information.

It is preferable that the electronic device described above includes a display information storage unit that stores screen information, a screen according to the screen information stored in the display information storage unit is displayed on the display screen, a native screen storage unit is provided in the first control circuit, when the first control circuit permits the second control circuit to perform display control, the first control circuit saves the native screen information stored in the display information storage unit into the native screen storage unit, and when the second control circuit is permitted to perform display control by the first control circuit, the second control circuit causes the display information storage unit to store the screen information received from the management server when the native screen information is saved into the native screen storage unit and causes the display screen to display a screen based on the screen information stored in the display information storage unit.

According to the above configuration, when the screen is switched from the native screen to the screen based on the screen information received from the management server, the native screen information is saved from the display information storage unit to the native screen storage unit, the screen information received from the management server by the second control circuit is stored in the display information storage unit, and the screen based on the screen information is displayed on the display screen. Therefore, when a user requests to return the screen on the display screen to the previous screen, it is possible to quickly return the display on the display screen to the previous screen by returning the native screen information saved in the native screen storage unit to the display information storage unit. As a result, it is possible to quickly switch the content of the display screen.

A display control method of an electronic device according to an aspect of the invention is a display control method of an electronic device that communicates with a management server through a network. The electronic device includes a display screen, a first control circuit that controls the electronic device, and a second control circuit that controls communication with the management server. The display control method includes first displaying in which the first control circuit causes the display screen to display a screen based on native screen information that is screen information prepared by the electronic device, and second displaying in which the second control circuit receives screen information from the management server and causes the display screen to display a screen based on the screen information.

According to the above configuration, it is possible to obtain the same functions and effects as those of the electronic device described above.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereinafter, an embodiment that embodies an electronic device and a display control method of an electronic device will be described with reference to FIGS. 1 to 11.

Figure 1:
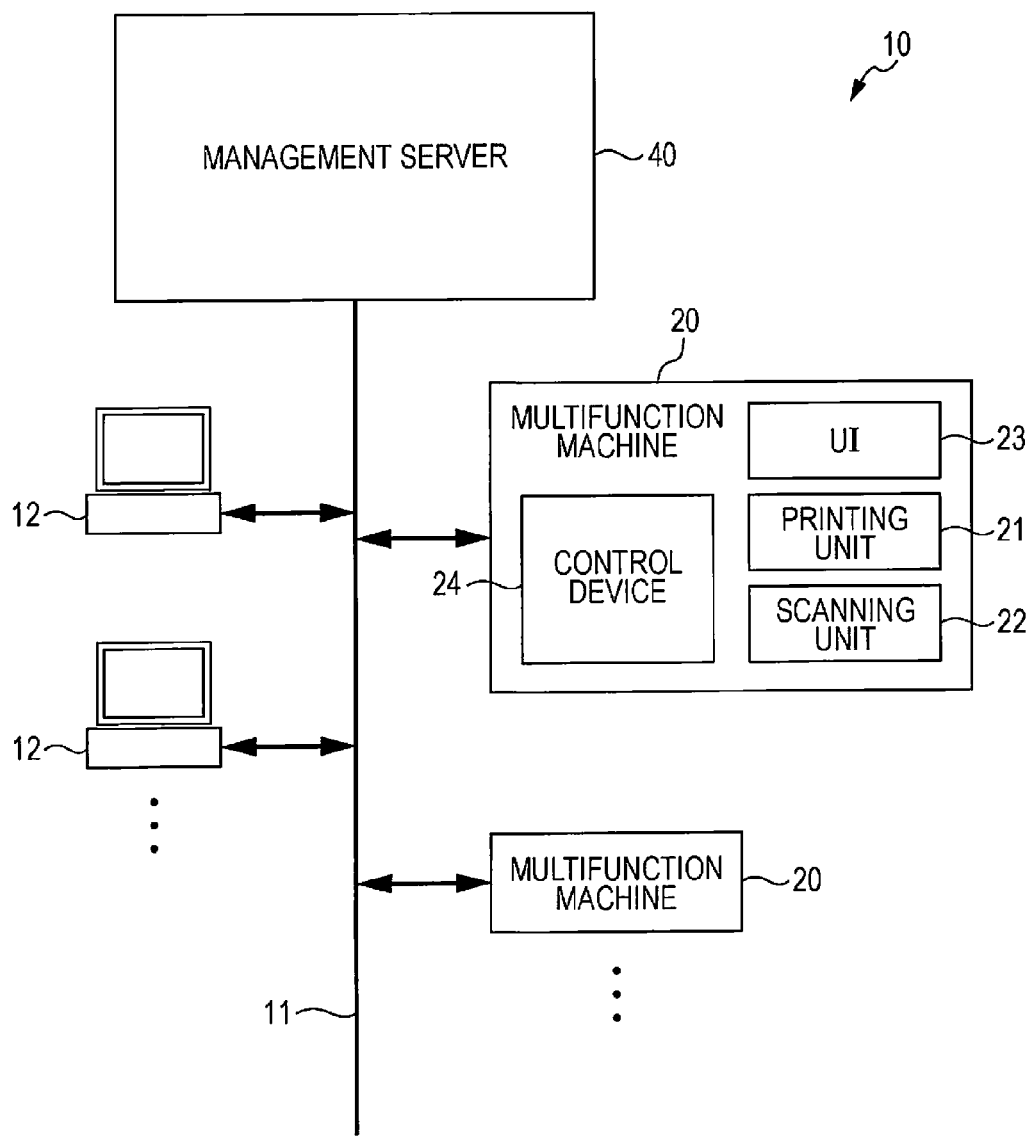
FIG. 1 is a schematic configuration diagram of a processing management system including a multifunction machine which is an embodiment of an electronic device.

FIG. 1 is a diagram showing a processing management system 10 including a multifunction machine 20 which is an example of an electronic device. As shown in FIG. 1, the processing management system 10 includes a management server 40 and a plurality of multifunction machines 20 that can communicate with the management server 40 through a network 11 such as LAN (Local Area Network). In the processing management system 10, information terminals 12 that are used by users are connected to the network 11.

The multifunction machine 20 includes an ink jet type printing unit 21 that performs printing on a medium such as a paper sheet, a scanning unit 22 that reads an image stored in a medium, a user interface 23, and a control device 24. The printing type of the printing unit 21 may also be types other than the ink jet type, such as a dot impact type, a laser type, and a thermosensitive type, which can perform printing on a medium.

Processing that can be performed by the multifunction machine 20 includes printing, copying, scanning, and facsimile (hereinafter referred to as "FAX"). For example, when a user operates the information terminal 20 and requests printing, a print job is transmitted from the information terminal 12 to the management server 40. When the print job is transmitted from the management server 40 to any one of the multifunction machines 20, the multifunction machine 20 performs printing based on the print job.

The printing is processing based on the print job received from the management server 40 and is an example of "reception-required processing" based on information received from the management server 40. On the other hand, processing other than the printing, that is, copying, scanning, and FAX, are examples of "reception-not-required processing" that need not require reception of information from the management server 40.

When processing such as the printing and the copying is performed by the multifunction machine 20, usage information which is information related to the processing is transmitted from the multifunction machine 20 to the management server 40. The usage information includes information related to the number of media where printing (or copying) is performed and a user who requests execution of the processing. The usage information is managed by the management server 40. The processing management system 10 performs, for example, an accounting service for each user or for each group including a plurality of users by using the usage information managed by the management server 40.

Next, the user interface 23 of the multifunction machine 20 will be described with reference to FIG. 2.

Figure 2:
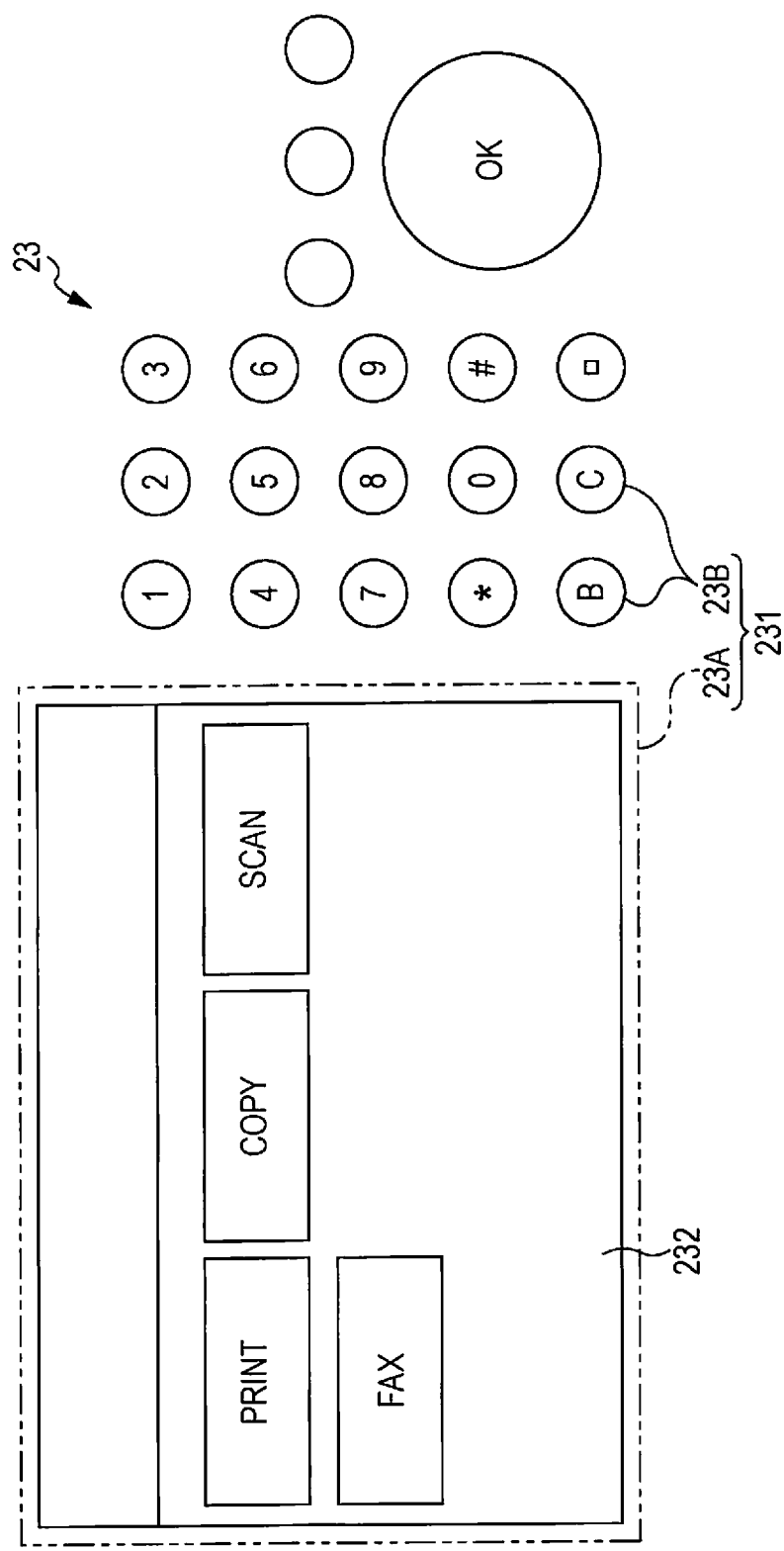
FIG. 2 is a schematic diagram showing an example of a user interface of the multifunction machine.

As shown in FIG. 2, the user interface 23 includes an operation unit 231 that receives an input operation performed by a user and a display screen 232. The operation unit 231 includes a touch panel 23A attached to the display screen 232 and a plurality of push-button type hard keys 23B. In FIG. 2, the touch panel 23A is shown by a two-dot chain line. Input information caused by an operation performed by a user on the operation unit 231 is inputted into a control device 24 of the multifunction machine 20. For example, "PRINT" on the display screen 232 is touched, panel operation information that is information related to an operation of the touch panel 23A is inputted into the control device 24 as input information, so that the control device 24 can detect that printing is requested by the user. On the other hand, when the hard keys 23B are operated, key operation information that is information related to an operation of the hard keys 23B is inputted into the control device 24 as input information.

Next, the control device 24 of the multifunction machine 20 will be described with reference to FIG. 3.

Figure 3:
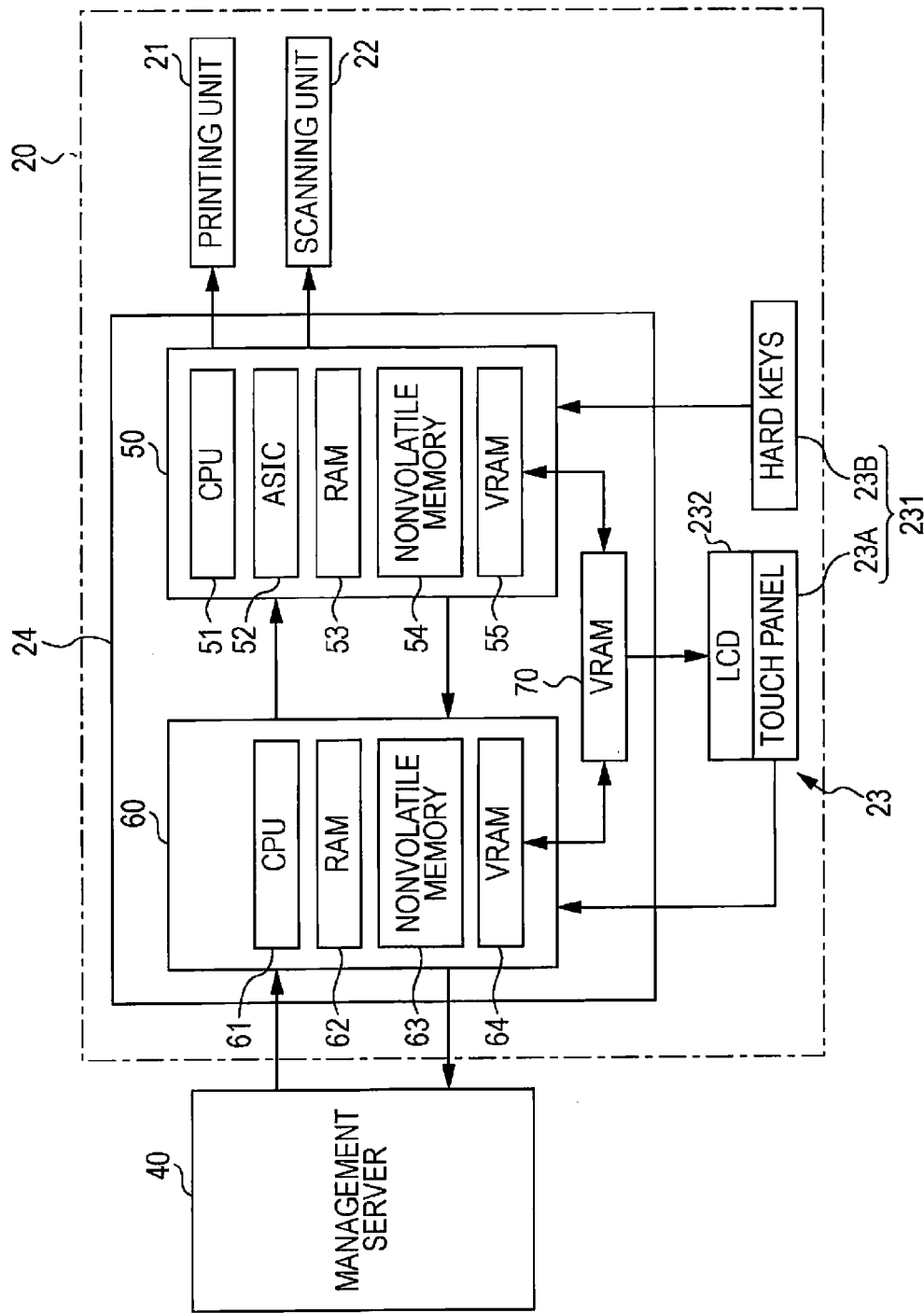
FIG. 3 is a block diagram showing a schematic configuration of the multifunction machine.

As shown in FIG. 3, the control device 24 has a multi-core processor. In other words, the control device 24 includes a plurality of (in this case, two) control circuits 50 and 60. A first control circuit 50 performs control of the multifunction machine 20 and a second control circuit 60 controls communication with the management server 40. The control circuits 50 and 60 are configured to be able to input/output information to/from each other.

For example, when a print request is inputted into the first control circuit 50 from the user interface 23, the first control circuit 50 performs print on a medium by controlling the printing unit 21. When a copy request is inputted into the first control circuit 50 from the user interface 23, the first control circuit 50 performs copy by controlling the printing unit 21 and the scanning unit 22. Further, when the hard keys 23B of the operation unit 231 of the user interface 23 are operated, key operation information that is information related to the operation of the hard keys 23B is inputted into the first control circuit 50 as input information.

The first control circuit 50 includes a CPU 51, an ASIC 52, a RAM 53, a nonvolatile memory 54, and a VRAM 55. The "ASIC" is an abbreviation of "Application Specific IC (IC for specific use)" and the "VRAM" is an abbreviation of "Video Random Access Memory". The nonvolatile memory 54 stores various programs executed by the CPU 51, necessary setting data, and the like. The RAM 53 temporarily stores a program executed by the CPU 51 and data such as various calculation results. The VRAM 55 stores screen information (hereinafter also referred to as "native screen information") that is information related to a native screen that is a screen which the first control circuit 50 causes the display screen 232 to display. In this respect, the VRAM 55 forms an example of a "native screen storage unit" that stores the native screen information.

Although described later in detail, the native screen is a screen prepared by the multifunction machine 20 and the native screen includes a screen prepared in advance in the multifunction machine 20 and a screen created by the first control circuit 50.

The second control circuit 60 includes a CPU 61, a RAM 62, a nonvolatile memory 63, and a VRAM 64. The nonvolatile memory 63 stores various programs executed by the CPU 61, necessary setting data, and the like. The RAM 62 temporarily stores a program executed by the CPU 61 and data such as various calculation results. The VRAM 64 stores screen information (hereinafter also referred to as "browser screen information") that is information related to a browser screen that is a screen which the second control circuit 60 causes the display screen 232 to display. The browser screen information is screen information received (downloaded) the management server 40. In the second control circuit 60, the browser screen information received from the management server 40 is stored in the VRAM 64. In this respect, the VRAM 64 forms an example of a "browser screen storage unit" that stores the browser screen information.

When the touch panel 23A of the operation unit 231 of the user interface 23 is operated, panel operation information that is information related to the operation of the touch panel 23A is inputted into the second control circuit 60 as input information. Then, the second control circuit 60 transmits the inputted panel operation information to the management server 40 and/or outputs the inputted panel operation information to the first control circuit 50.

The control device 24 includes a VRAM 70 separately from the VRAM 55 of the first control circuit 50 and the VRAM 64 of the second control circuit 64. The VRAM 70 stores screen information related to a screen displayed on the display screen 232. In this respect, the VRAM 70 forms an example of a "display information storage unit". Both the first control circuit 50 and the second control circuit 60 can access the VRAM 70. The first control circuit 50 and the second control circuit 60 have a display control driver for controlling the display screen 232. Therefore, in the multifunction machine 20 of the embodiment, the first control circuit 50 can perform display control and the second control circuit 60 can perform display control.

Specifically, which control circuit performs the display control is determined by the first control circuit 50. In other words, the first control circuit manages a control right of the display screen 232. For example, when the first control circuit 50 has the control right, the first control circuit 50 causes the VRAM 70 to store the native screen information and causes the display screen 232 to display a native screen based on the native screen information. On the other hand, when the second control circuit 60 is given the control right from the first control circuit 50, in other words, when the display control by the second control circuit 60 is allowed by the first control circuit 50, the second control circuit 60 receives browser screen information from the management server 40 and causes the VRAM 70 to store the browser screen information. Then, the second control circuit 60 causes the display screen 232 to display a browser screen based on the browser screen information stored in the VRAM 70.

Next, screens displayed on the display screen 232 of the multifunction machine 20 will be described with reference to FIGS. 4 to 7.

Figure 4:
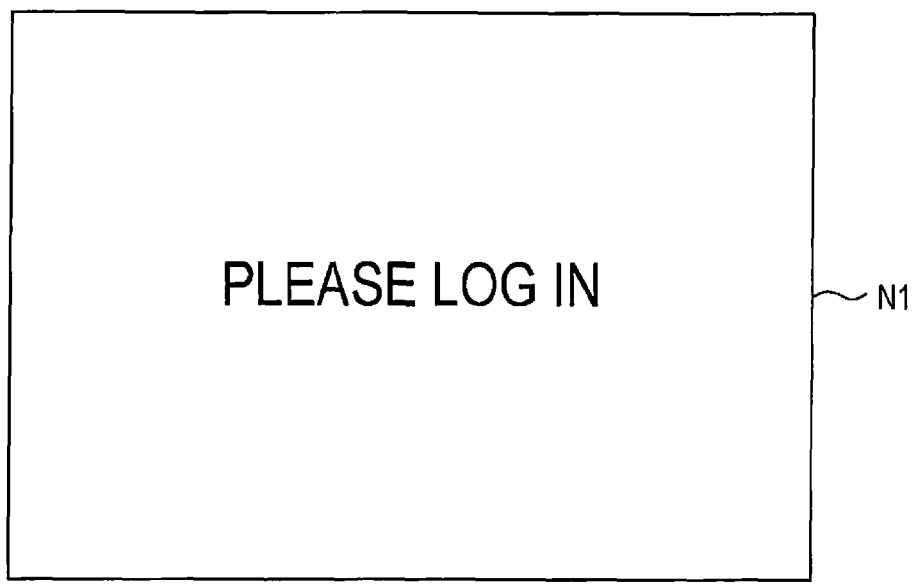
FIG. 4 is a diagram showing a screen urging to log in to the multifunction machine.

The screen shown in FIG. 4 is a login screen N1 that is displayed to urge a user to login to the multifunction machine 20 when the multifunction machine 20 is logged off. The login screen N1 is a native screen provided in advance to the control device 24 of the multifunction machine 24.

Figure 5:
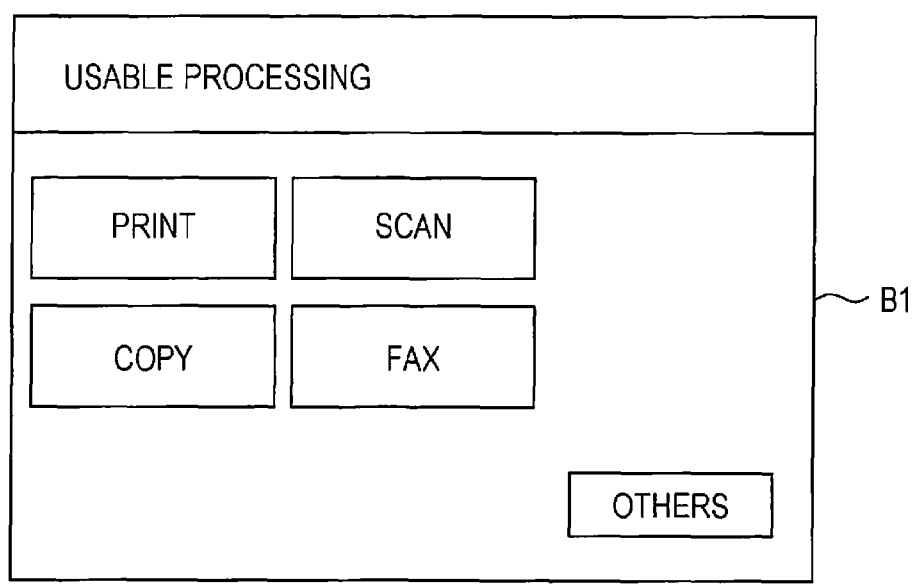
FIG. 5 is a diagram showing an example of a screen that shows processing allowed to be used in the multifunction machine.

The screen shown in FIG. 5 is an example of a processing selection screen B1 in a case in which the multifunction machine 20 and the management server 40 can communicate with each other and a user logs in to the multifunction machine 20. In the processing selection screen B1, "PRINT", "COPY", "SCAN", "FAX", and "OTHERS" are selectably displayed. When the "OTHERS" is selected on the processing selection screen B1, various maintenances and settings of the multifunction machine 20 can be performed. The processing selection screen B1 is a browser screen created by the management server 40.

For example, when the "PRINT" is selected on the processing selection screen B1, the second control circuit 60 transmits information indicating that the "PRINT" is selected to the management server 40. In the management server 40, a screen for displaying a list of print jobs that can be selected by a user who logs in to the multifunction machine 20 is created. When the management server 40 has received the information indicating that the "PRINT" is selected from the second control circuit 60, the management server 40 transmits browser screen information related to a screen for displaying a list of executable print jobs to the multifunction machine 20. When reception-not-required processing such as "COPY" is selected on the processing selection screen B1, the second control circuit 60 transmits information indicating that the reception-not-required processing is selected to the first control circuit 50. Then, the first control circuit 50 causes the display screen 232 to display a screen to urge a user to set execution conditions of the selected processing.

Figure 6:
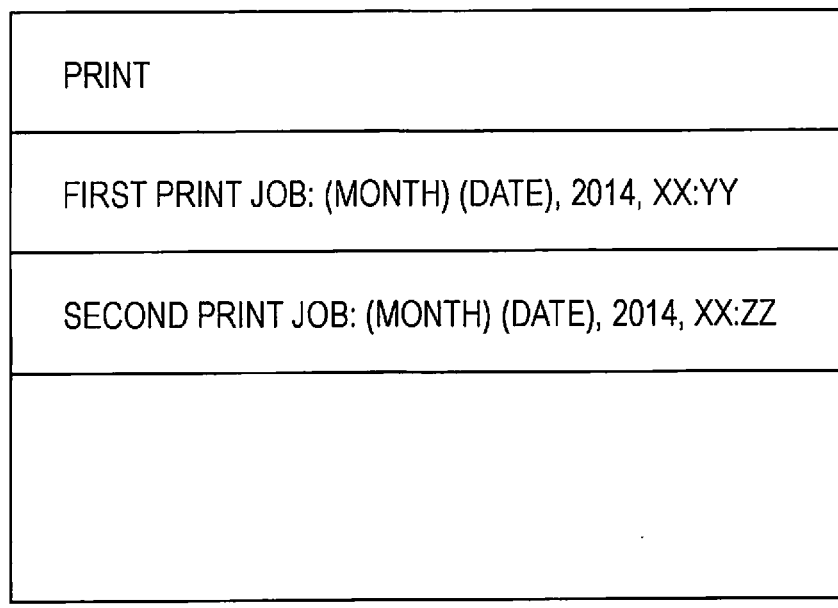
FIG. 6 is a diagram showing an example of a screen that shows a list of print jobs that can be selected.

The screen shown in FIG. 6 is an example of a screen when the "PRINT" is selected on the processing selection screen B1. This screen is an example of a job list screen B2 that displays a list of print jobs that can be selected by a user. For example, when the "FIRST PRINT JOB" is selected on the job list screen B2, the second control circuit 60 requests the first print job from the management server 40. When the first print job is received from the management server 40, the second control circuit 60 outputs the first print job to the first control circuit 50. Then, the first control circuit 50 executes printing based on the first print job. The job list screen B2 is a browser screen created by the management server 40.

Figure 7:
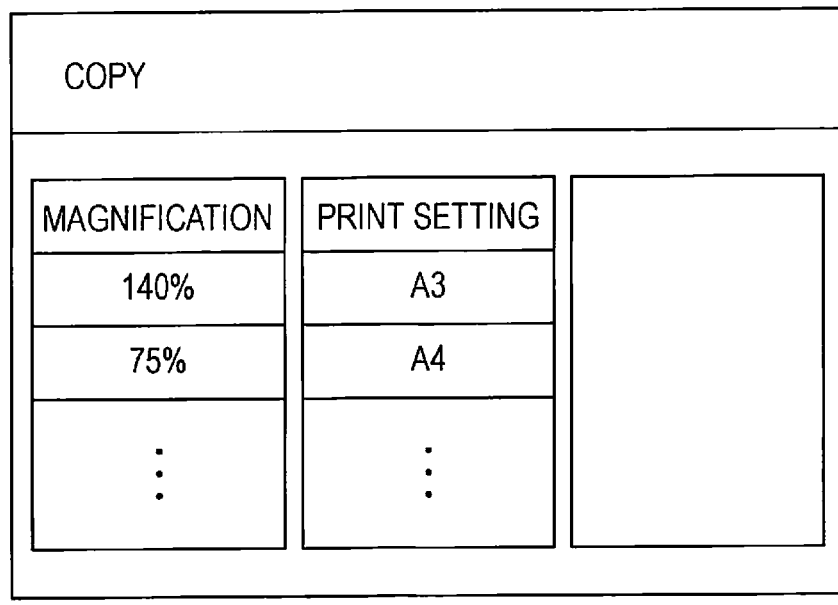
FIG. 7 is a diagram showing an example of a screen urging to select various conditions prior to performing a copy.

The screen shown in FIG. 7 is an example of a screen when the "COPY" is selected, on the processing selection screen B1. This screen is a condition selection screen N2 that urges a user to select various conditions (magnification, paper size, and the like) when causing copy to be executed. At this time, content selected on the condition selection screen N2 is inputted into the first control circuit 50 through the second control circuit 60. When selection of all the conditions is completed, the first control circuit 50 executes the copy. The condition selection screen N2 that urges a user to select execution conditions of reception-not-required processing such as the copy is a native screen prepared in advance in the multifunction machine 20.

Next, an example of a processing procedure when a screen to be displayed on the display screen 232 is switched from a native screen to a browser screen by a request from the management server 40 will be described with reference to a flowchart shown in FIG. 8. For example, as in a case in which information related to the accounting service described above is notified to a user, when information managed by the management server 40 is notified to a user, the screen is switched by the processing procedure described with reference to FIG. 8. A browser screen displayed on the display screen 232 in step S2-15 described later has already been created before the processing described with reference to FIG. 8 is started.

Figure 8:
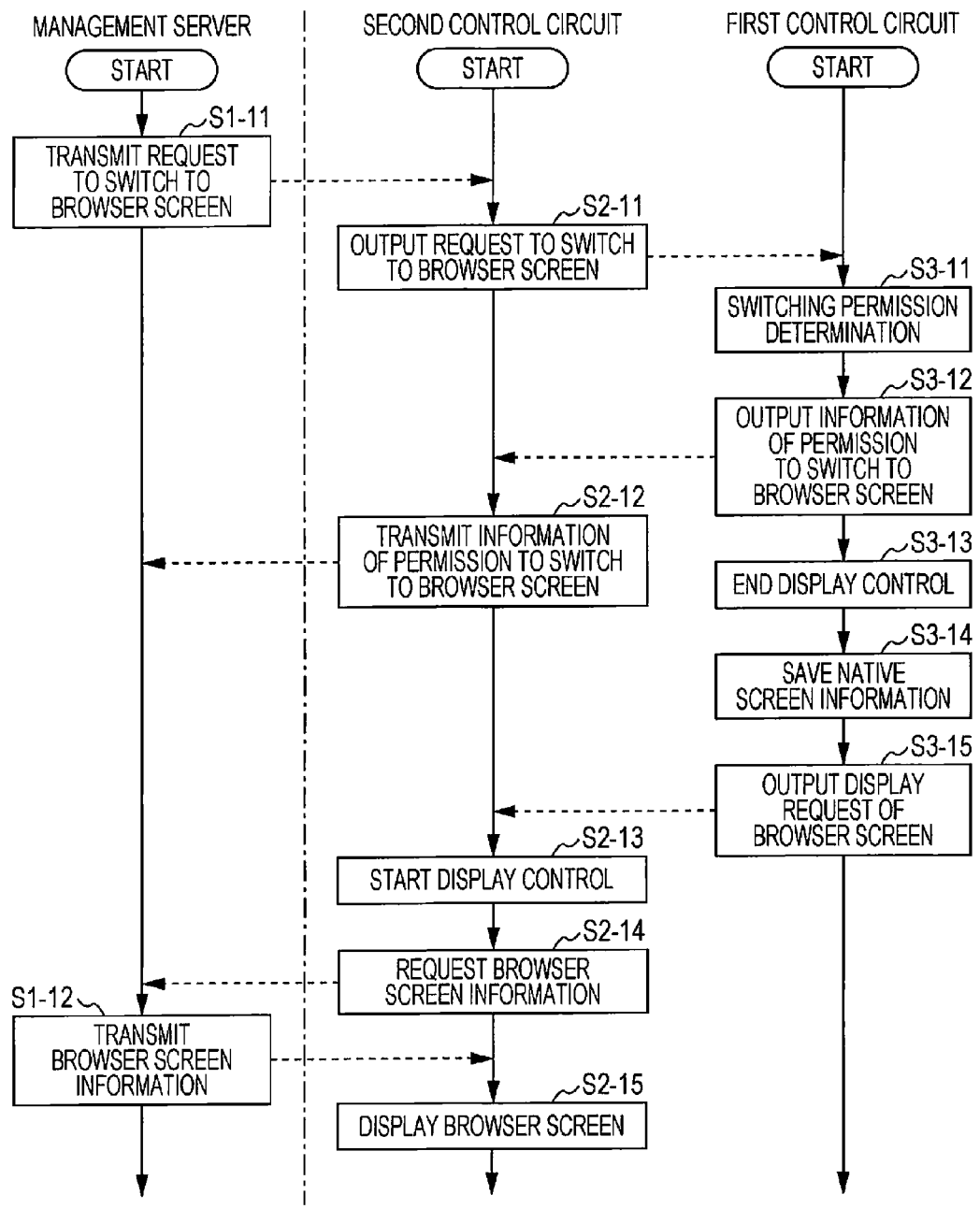
FIG. 8 is a flowchart for explaining an example of a processing procedure for switching a display screen.

As shown in FIG. 8, the management server 40 transmits information of a request to switch to a browser screen to the multifunction machine 20 (step S1-11). This request includes a URL which is position information of a browser screen to be displayed on the display screen 232 in step S2-15 described later. The "URL" is an abbreviation of "Uniform Resource Locator". The request is received by the second control circuit 60 in the control device 24 of the multifunction machine 20. Then, in the second control circuit 60, the request received from the management server 40 (that is, the request including the URL described above) is outputted to the first control circuit 50 (step S2-11).

When the request is inputted into the first control circuit 50, switching permission determination for determining whether or not to permit the switching to the browser screen from the native screen is performed in the first control circuit 50 (step S3-11). When the switching of the screen is permitted, the first control circuit 50 outputs information of permission to switch to the browser screen from the native screen to the second control circuit 60 (step S3-12). When the information of permission of the switching is inputted into the second control circuit 60, the second control circuit 60 transmits information of permission to switch to the browser screen from the native screen to the management server 40 (step S2-12).

The first control circuit 50 ends the display control that causes the display screen 232 to display the native screen (step S3-13). For example, a display control application that is activated to cause the display screen 232 to display the native screen is ended. Then, the first control circuit 50 saves native screen information stored in the VRAM 70 into the VRAM 55 of the first control circuit 50 (step S3-14) and outputs a display request of the browser screen to the second control circuit 60 (step S3-15). Thereby, a control right to cause the display screen 232 to display a screen is transferred from the first control circuit 50 to the second control circuit 60, and the display control by the second control circuit 60 is permitted.

Then, in the second control circuit 60, the display control is started (step S2-13). For example, a web browser is activated. Subsequently, the second control circuit 60 transmits information to request browser screen information related to the browser screen of the URL to the management server 40 (step S2-14). When the information is received by the management server 40, the management server 40 transmits the browser screen information related to the browser screen of the URL specified by the second control circuit 60 to the multifunction machine 20 (step S1-13). The browser screen information is received (downloaded) by the second control circuit 60 of the multifunction machine 20.

Then, in the second control circuit 60, the received browser screen information is stored in the VRAM 64 of the second control circuit 60, and the browser screen information is transferred from the VRAM 64 to the VRAM 70. Then, a browser screen based on the browser screen information stored in the VRAM 70 is displayed on the display screen 232 by the display control of the second control circuit 60 (step S2-15). In this respect, steps S2-14 and S2-15 form an example of a "second display step" which causes the second control circuit 60 to receive the browser screen information from the management server 40 and causes the display screen 232 to display the browser screen based on the browser screen information.

Next, an example of a processing procedure when an image to be displayed on the display screen 232 is switched from a native screen to a browser screen by a request from the first control circuit 50 will be described with reference to a flowchart shown in FIG. 9. Under a situation in which a native screen is displayed on the display screen 232, when the operation unit 231 is operated by a user and it becomes necessary to display the processing selection screen B1 (an example of the browser screen) on the display screen 232, the screen is switched by a processing procedure described with reference to FIG. 9. A browser screen displayed on the display screen 232 in step S2-26 described later has already been created before the processing described with reference to FIG. 9 is started.

Figure 9:
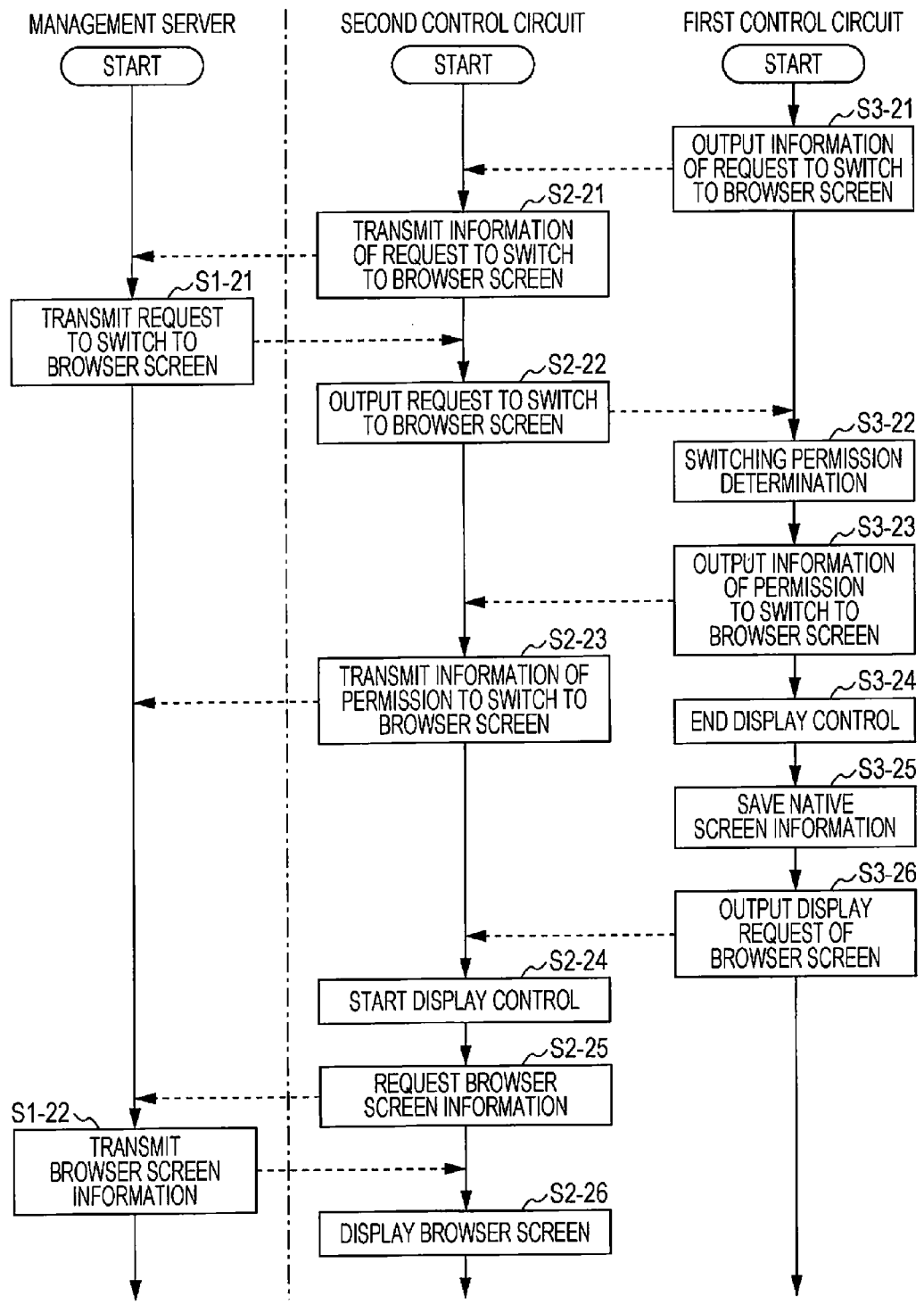
FIG. 9 is a flowchart for explaining an example of a processing procedure for switching a display screen.

As shown in FIG. 9, in the multifunction machine 20, the first control circuit 50 outputs information of a request to switch to a browser screen to the second control circuit 60 (step S3-21). When the request is inputted into the second control circuit 60, the second control circuit 60 transmits the request inputted from the first control circuit 50 to the management server 40 (step S2-21). When the management server 40 receives the request, the management server 40 transmits information of a request to switch to a browser screen to the multifunction machine 20 (step S1-21). This request includes a URL which is position information of a browser screen to be displayed on the display screen 232 in step S2-26 described later. The request is received by the second control circuit 60 in the control device 24 of the multifunction machine 20. Then, in the second control circuit 60, the request received from the management server 40 (that is, the request including the URL described above) is outputted to the first control circuit 50 (step S2-22).

When the request is inputted into the first control circuit 50, switching permission determination for determining whether or not to permit the switching to the browser screen from the native screen is performed in the first control circuit 50 (step S3-22). When the switching of the screen is permitted, the first control circuit 50 outputs information of permission to switch to the browser screen from the native screen to the second control circuit 60 (step S3-23). When the information of permission of the switching is inputted into the second control circuit 60, the second control circuit 60 transmits information of permission to switch to the browser screen from the native screen to the management server 40 (step S2-23).

On the other hand, in the first control circuit 50 which has executed the step S3-23, the display control to cause the display screen 232 to display the native screen is ended (step S3-24). For example, a display control application that is activated to cause the display screen 232 to display the native screen is ended. Then, the first control circuit 50 saves native screen information stored in the VRAM 70 into the VRAM 55 of the first control circuit 50 (step S3-25) and outputs a display request of the browser screen to the second control circuit 60 (step S3-26). Thereby, a control right to cause the display screen 232 to display a screen is transferred from the first control circuit 50 to the second control circuit 60, and the display control by the second control circuit 60 is permitted.

Then, in the second control circuit 60, the display control is started (step S2-24). For example, a web browser is activated. Subsequently, the second control circuit 60 transmits information to request browser screen information related to the browser screen of the URL to the management server 40 (step S2-25). When the information is received by the management server 40, the management server 40 transmits the browser screen information related to the browser screen of the URL specified by the second control circuit 60 to the multifunction machine 20 (step S1-22). The browser screen information is received (downloaded) by the second control circuit 60 of the multifunction machine 20.

Then, in the second control circuit 60, the received browser screen information is stored in the VRAM 64 of the second control circuit 60, and the browser screen information is transferred from the VRAM 64 to the VRAM 70. Then, a browser screen based on the browser screen information stored in the VRAM 70 is displayed on the display screen 232 by the display control of the second control circuit 60 (step S2-26). In this respect, steps S2-25 and S2-26 form an example of the "second display step" which causes the second control circuit 60 to receive the browser screen information from the management server 40 and causes the display screen 232 to display the browser screen based on the browser screen information.

Next, a processing procedure when an image to be displayed on the display screen 232 is switched from a browser screen to a native screen by a request from the management server 40 will be described with reference to a flowchart shown in FIG. 10. Under a situation in which the processing selection screen B1 (an example of the browser screen) is displayed on the display screen 232, when the copy which is an example of the reception-not-required processing is selected by an operation on the touch panel 23A by a user, the screen is switched by a processing procedure described with reference to FIG. 10.

Figure 10:
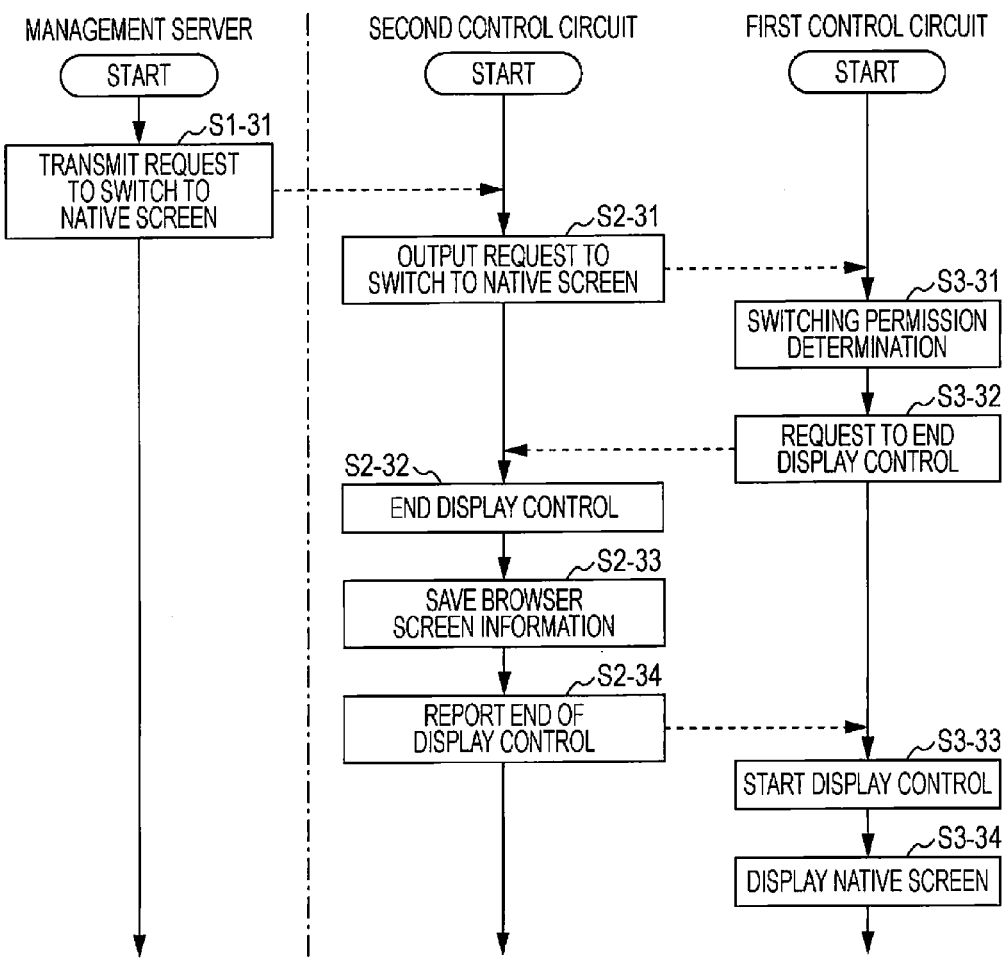
FIG. 10 is a flowchart for explaining an example of a processing procedure for switching a display screen.

As shown in FIG. 10, the management server 40 transmits a request to switch to a native screen to the multifunction machine 20 (step S1-31). The request is received by the second control circuit 60 in the control device 24 of the multifunction machine 20. Then, in the second control circuit 60, the request received from the management server 40 is outputted to the first control circuit 50 (step S2-31).

When the request is inputted into the first control circuit 50, switching permission determination for determining whether or not to permit the switching to the native screen from the browser screen is performed in the first control circuit 50 (step S3-31). When the switching of the screen is permitted, the first control circuit 50 outputs information of a request to end the display control to the second control circuit 60 (step S3-32).

When the request is inputted into the second control circuit 60, the second control circuit 60 ends the display control that causes the display screen 232 to display the browser screen (step S3-32). For example, a web browser that is activated to cause the display screen 232 to display the browser screen is ended. Then, the second control circuit 60 saves browser screen information stored in the VRAM 70 into the VRAM 64 of the second control circuit 60 (step S2-33) and outputs information indicating that the display control is ended to the first control circuit 50 (step S2-34). Thereby, a control right to cause the display screen 232 to display a screen is returned to the first control circuit 50 from the second control circuit 60, and the display control by the first control circuit 50 is permitted.

Then, in the first control circuit 50, the display control is started (step S3-33). For example, a display control application to cause the display screen 232 to display the native screen is activated. Subsequently, the first control circuit 50 causes the VRAM 70 to store native screen information related to, for example, the condition selection screen N2 (see FIG. 7). Then, a native screen based on the native screen information stored in the VRAM 70 is displayed on the display screen 232 by the display control of the first control circuit 50 (step S3-34). In this respect, step S3-34 forms an example of a "first display step" in which the first control circuit 50 causes the display screen 232 to display the native screen based on the native screen information prepared in the multifunction machine 20.

Next, a processing procedure when an image to be displayed on the display screen 232 is switched from a browser screen to a native screen by a request from the first control circuit 50 will be described with reference to a flowchart shown in FIG. 11.

Figure 11:
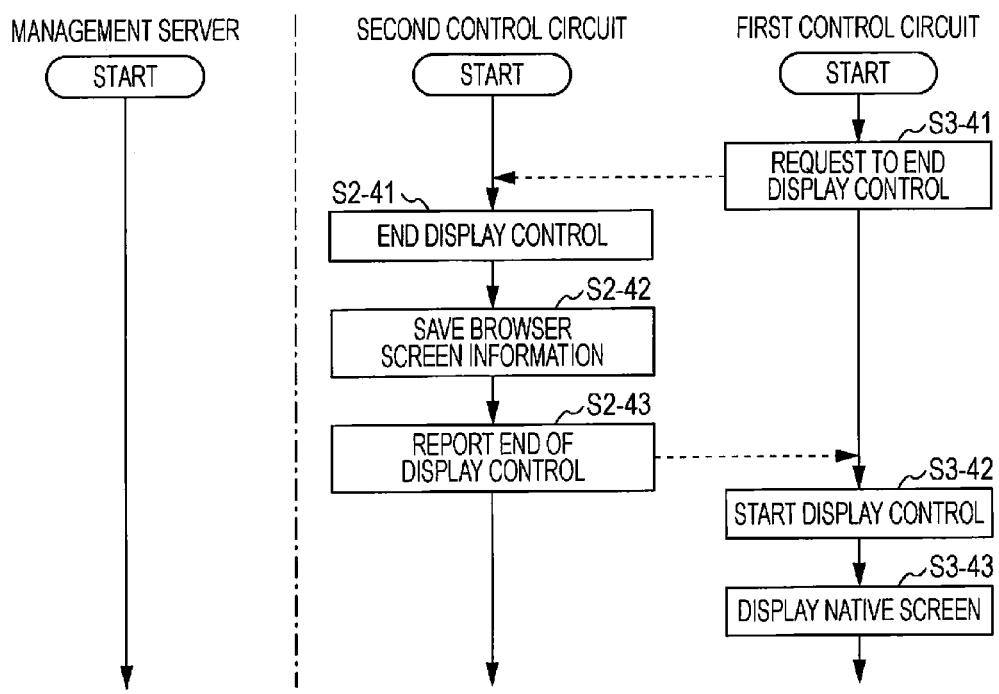
FIG. 11 is a flowchart for explaining an example of a processing procedure for switching a display screen.

As shown in FIG. 11, the first control circuit 50 in the multifunction machine 20 outputs information of a request to end the display control to the second control circuit 60 (step S3-41).

When the request is inputted into the second control circuit 60, the second control circuit 60 ends the display control that causes the display screen 232 to display the browser screen (step S2-41). For example, a web browser that is activated to cause the display screen 232 to display the browser screen is ended. Then, the second control circuit 60 saves browser screen information stored in the VRAM 70 into the VRAM 64 of the second control circuit 60 (step S2-42) and outputs information indicating that the display control is ended to the first control circuit 50 (step S2-43). Thereby, a control right to cause the display screen 232 to display a screen is returned to the first control circuit 50 from the second control circuit 60, and the display control by the first control circuit 50 is permitted.

Then, in the first control circuit 50, the display control is started (step S3-42). For example, a display control application to cause the display screen 232 to display the native screen is activated. At this time, the first control circuit 50 stores native screen information into the VRAM 70. Then, a native screen based on the native screen information stored in the VRAM 70 is displayed on the display screen 232 by the display control of the first control circuit 50 (step S3-43). In this respect, step S3-43 forms an example of the "first display step" in which the first control circuit 50 causes the display screen 232 to display the native screen based on the native screen information prepared in the multifunction machine 20.

According to the embodiment described above, it is possible to obtain the effects as described below.

(1) In the multifunction machine 20 of the embodiment, when the native screen is displayed on the display screen 232, the display control is performed by the first control circuit 1. On the other hand, when the browser screen is displayed on the display screen 232, the display control is performed by the second control circuit 60, which controls communication with the management server 40, instead of the first control circuit 50. The display control is shared by the two control circuits 50 and 60 in this manner, so that it is possible to suppress increase of control load of the first control circuit 50 when causing the display screen 232 to display the browser screen based on the browser screen information received from the management server 40.

(2) The determination on whether the first control circuit 50 or the second control circuit 60 performs the display control is performed by the first control circuit 50. Therefore, when the screen is switched from the native screen to the browser screen, the control circuit that performs the display control is smoothly switched from the first control circuit 50 to the second control circuit 60, so that it is possible to smoothly switch the content of the display screen 232. In the same manner, when the screen is switched from the browser screen to the native screen, the control circuit that performs the display control is smoothly switched from the second control circuit 60 to the first control circuit 50, so that it is possible to smoothly switch the content of the display screen 232.

(3) Even when the control circuit that performs the display control is the first control circuit 50 or the second control circuit 60, the panel operation information related to the operation of the touch panel 23A is inputted into the second control circuit 60. Therefore, as compared with a case in which the panel operation information is directly inputted into the first control circuit 50 when the first control circuit 50 performs the display control and the panel operation information is directly inputted into the second control circuit 60 when the second control circuit 60 performs the display control, it is possible to suppress complication of the configuration of the control device 24 of the multifunction machine 20 because the control device 24 does not require a configuration to switch the input destination of the panel operation information.

When the first control circuit 50 performs the display control, the panel operation information is inputted into the first control circuit 50 through the second control circuit 60. Therefore, the first control circuit 50 can perform processing according to a request of a user who operates the touch panel 23A.

(4) When the second control circuit 60 performs the display control, the second control circuit 60 transmits the inputted panel operation information to the management server 40. When it is assumed that a multifunction machine in which the panel operation information is inputted into the first control circuit 50 is a multifunction machine of a comparative example, in the multifunction machine of the comparative example, the panel operation information is transmitted from the first control circuit 50 to the management server 40 through the second control circuit 60, so that a delay easily occurs when the panel operation information is transmitted to the management server 40. In this respect, in the multifunction machine 20 of the embodiment, the panel operation information is inputted into the second control circuit 60, so that, different from the multifunction machine of the comparative example, a delay hardly occurs when the panel operation information is transmitted to the management server 40. Therefore, it is possible to contribute to increasing the processing speed of the processing management system 10 including the multifunction machine 20 and the management server 40.

(5) On the other hand, even when the control circuit that performs the display control is the first control circuit 50 or the second control circuit 60, the key operation information related to an operation of the hard keys 23B is inputted into the first control circuit 50. Therefore, as compared with a case in which the key operation information is inputted into the first control circuit 50 when the first control circuit 50 performs the display control and the key operation information is inputted into the second control circuit 60 when the second control circuit 60 performs the display control, it is possible to suppress complication of the configuration of the control device 24 of the multifunction machine 20 because the control device 24 does not require a configuration to switch the input destination of the key operation information.

(6) When the native screen is switched to the browser screen, the native screen information is saved from the VRAM 70 to the VRAM 55 of the first control circuit 50. Therefore, when it is requested to return the screen on the display screen 232 to the previous screen by a user's operation on the hard keys 23B, it is possible to quickly return the display on the display screen 232 to the previous screen by returning the native screen information saved in the VRAM 55 to the VRAM 70 and returning the control right from the second control circuit 60 to the first control circuit 50. As a result, it is possible to contribute to increasing the switching speed of the display content of the display screen 232.

(7) In the same manner, when the browser screen is switched to the native screen, the browser screen information is saved from the VRAM 70 to the VRAM 64 of the second control circuit 60. Therefore, when it is requested to return the screen on the display screen 232 to the previous screen by a user's operation on the hard keys 23B, it is possible to quickly return the display on the display screen 232 to the previous screen by returning the browser screen information saved in the VRAM 64 to the VRAM 70 and transferring the control right from the first control circuit 50 to the second control circuit 60. As a result, it is possible to contribute to increasing the switching speed of the display content of the display screen 232.

The embodiment described above may be changed as follows:

When switching from the browser screen to the native screen, it is not necessary to save the browser screen information from the VRAM 70 to the VRAM 64 of the second control circuit 60.

When switching from the native screen to the browser screen, it is not necessary to save the native screen information from the VRAM 70 to the VRAM 55 of the first control circuit 50.

The key operation information related to an operation of the hard keys 23B may be directly inputted into the second control circuit 60. In this case, if it is necessary to input the key operation information into the first control circuit 50, it is preferable to cause the second control circuit 60 to input the key operation information into the first control circuit 50.

The panel operation information related to an operation of the touch panel 23A may be directly inputted into the first control circuit 50. In this case, when the panel operation information is inputted into the first control circuit 50 under a situation in which the second control circuit 60 performs the display control, it is preferable that the first control circuit 50 outputs the panel operation information to the second control circuit 60 and the second control circuit 60 transmits the panel operation information to the management server 40.

The control device 24 of the multifunction machine 20 may have a configuration including a switching circuit for switching the input destination of the panel operation information related to an operation on the touch panel 23A. In this case, the switching circuit may input the panel operation information into the first control circuit 50 when the first control circuit 50 performs the display control, and the switching circuit may input the panel operation information into the second control circuit 60 when the second control circuit 60 performs the display control.

The control device 24 of the multifunction machine 20 may have a configuration including a switching circuit for switching the input destination of the key operation information related to an operation on the hard keys 23B. In this case, the switching circuit may input the key operation information into the first control circuit 50 when the first control circuit 50 performs the display control, and the switching circuit may input the key operation information into the second control circuit 60 when the second control circuit 60 performs the display control.

The second control circuit 60 may be caused to determine whether the display control is performed by the first control circuit 50 or the second control circuit 60. In this case, when the first control circuit 50 is given the control right from the second control circuit 60, the first control circuit 50 performs the display control in order to cause the display screen 232 to display the native screen.

The browser screen information may be received (downloaded) from the management server 40 before the display request of the browser screen is outputted from the first control circuit 50 to the second control circuit 60. In this case, the browser screen information received from the management server 40 is stored in the VRAM 64 of the second control circuit 60. After the display request of the browser screen is inputted into the second control circuit 60 from the first control circuit 50, the second control circuit 60 may move the browser screen information stored in the VRAM 64 of the second control circuit 60 to the VRAM 70 and cause the display screen 232 to display a browser screen based on the browser screen information.

The electronic device may be an electronic device other than the multifunction machine if the electronic device includes a display screen and a plurality of control circuits. For example, the electronic device may be a printer that can perform only printing or a copy machine that can perform only copying.

Next, a technical idea that can be grasped from the embodiment described above and other embodiments will be additionally described below.

(A) When a browser screen storage unit is provided in the second control circuit, and when screen information received from the management serve is defined as browser screen information and a screen based on the browser screen information is defined as a browser screen, it is preferable that when the second control circuit switches a screen displayed on the display screen from the browser screen to a native screen based on the native screen information, the second control circuit saves the browser screen information stored in the display information storage unit into the browser screen storage unit, and when the first control circuit switches the screen displayed on the display screen from the browser screen to the native screen, the first control circuit causes the display data storage unit to store the native screen information when the browser screen information is saved in the browser screen storage unit and the first control circuit causes the display screen to display the native screen based on the native screen information.

According to the configuration described above, when the screen is switched from the browser screen to the native screen, the browser screen information is saved from the display information storage unit to the browser screen storage unit. Therefore, when a user requests to return the screen on the display screen to the previous screen, it is possible to quickly return the display on the display screen to the previous screen by returning the browser screen information saved in the browser screen storage unit to the display information storage unit. As a result, it is possible to contribute to increasing the switching speed of the display content of the display screen.

(B) It is preferable that the electronic device includes a printing unit that performs printing on a medium and the first control circuit controls drive of the printing unit.

The entire disclosure of Japanese Patent Application No. 2014-185242, filed Sep. 11, 2014 is expressly incorporated by reference herein.

What is claimed is:

1. An electronic device that communicates with a management server through a network, the electronic device comprising:
a user interface having a display screen and a touch panel;
a first control circuit that controls the electronic device and the display screen; and
a second control circuit that controls the display screen and communication with the management server;
the first control circuit causing the display screen to display a screen based on native screen information that is screen information stored in the first control circuit in advance or created by the first control circuit, without using a web browser, and
the second control circuit receiving screen information from the management server and causing the display screen to display, using the web browser, a screen based on the screen information,
the touch panel outputting information on an operation to the touch panel to one of the first and second control circuits in response to the operation to the touch panel without configuration of switching a destination of the information between the first and the second control circuits,
in response to the operation to the touch panel while the one of the first and second control circuits controls the display screen, the one of the first and second control circuits receiving the information on the operation,
in response to the operation to the touch panel while the other of the first and second control circuits controls the display screen, the one of the first and second control circuits receiving the information on the operation.

2. The electronic device according to claim 1, wherein the first control circuit determines a control circuit that performs display control, and
the second control circuit receives screen information from the management server and causes the display screen to display a screen based on the screen information when the first control circuit permits the second control circuit to perform display control.

3. The electronic device according to claim 2, wherein in response to the operation to the touch panel while the other of the first and second control circuits controls the display screen, the one of the first and second control circuits receives the information on the operation and further outputs the information to the other of the first and second control circuits, and
the other of the first and second control circuits performs processing according to the information inputted from the one of the first and second control circuits.

4. The electronic device according to claim 2, wherein the touch panel outputs the information on the operation to the second control circuit,
in response to the operation to the touch panel while the first control circuit controls the display screen, the second control circuit receives the information on the operation and outputs the information to the first control circuit, and
the first control circuit performs processing according to the information inputted from the second control circuit.

5. The electronic device according to claim 2, wherein the user interface includes a push-button type hard key,
when the hard key is operated, key operation information that is information related to the operation of the hard key is inputted into the first control circuit, and
the first control circuit performs processing according to the inputted key operation information.

6. The electronic device according to claim 2, further comprising:
a display information storage unit that stores screen information,
wherein a screen according to the screen information stored in the display information storage unit is displayed on the display screen,
a native screen storage unit is provided in the first control circuit, when the first control circuit permits the second control circuit to perform display control, the first control circuit saves the native screen information stored in the display information storage unit into the native screen storage unit, and when the second control circuit is permitted to perform display control by the first control circuit, the second control circuit causes the display information storage unit to store the screen information received from the management server when the native screen information is saved into the native screen storage unit and causes the display screen to display a screen based on the screen information stored in the display information storage unit.

7. The electronic device according to claiml, further comprising
a video memory,
wherein the first control circuit writes the native screen information into the video memory,
the second control circuit writes the received screen information into the video memory, and
the display screen displays the screen based on at least one of the native screen information written into the video memory and the received screen information written into the video memory.

8. A display control method of an electronic device that communicates with a management server through a network, the electronic device including a display screen and a touch panel, a first control circuit that controls the electronic device and the display screen, and a second control circuit that controls the display screen and communication with the management server, the display control method comprising:

first displaying in which the first control circuit causes the display screen to display a screen based on native screen information that is screen information stored in the first control circuit in advance or created by the first control circuit, without using a web browser;

second displaying in which the second control circuit receives screen information from the management server and causes the display screen to display, using the web browser, a screen based on the screen information;

outputting, by the touch panel, information on an operation to the touch panel to one of the first and second control circuits in response to the operation to the touch panel without configuration of switching a destination of the information between the first and the second control circuits;

in response to the operation to the touch panel while the one of the first and second control circuits controls the display screen, receiving the information on the operation by the one of the first and second control circuits; and in response to the operation to the touch panel while the other of the first and second control circuits controls the display screen, receiving the information on the operation by the one of the first and second control circuits.

* * * * *